(12) United States Patent
Fan

(10) Patent No.: US 9,895,776 B2
(45) Date of Patent: Feb. 20, 2018

(54) METHOD OF MANUFACTURING AN ECCENTRIC VALVE

(71) Applicant: JDV CONTROL VALVES CO., LTD, Yangmei, Taoyuan County (TW)

(72) Inventor: Yi-Ming Fan, Yangmei (TW)

(73) Assignee: JDV CONTROL VALVES CO., LTD, Yangmei, Taoyuan County (TW)

(*) Notice: Subject to any disclaimer, the term of this patent is extended or adjusted under 35 U.S.C. 154(b) by 24 days.

(21) Appl. No.: 15/265,277

(22) Filed: Sep. 14, 2016

(65) Prior Publication Data
US 2017/0001271 A1    Jan. 5, 2017

Related U.S. Application Data

(62) Division of application No. 14/617,693, filed on Feb. 9, 2015, now Pat. No. 9,470,318.

(30) Foreign Application Priority Data

Dec. 16, 2014 (TW) .............................. 103143797 A

(51) Int. Cl.
    *F16K 1/226*      (2006.01)
    *B23P 15/00*      (2006.01)
    *F16K 27/02*      (2006.01)

(52) U.S. Cl.
CPC .............. *B23P 15/001* (2013.01); *F16K 1/226* (2013.01); *F16K 1/2261* (2013.01); *F16K 27/0218* (2013.01); *F16K 1/2263* (2013.01)

(58) Field of Classification Search
CPC ...... B23P 15/001; F16K 27/0218; F16K 1/22; F16K 1/222; F16K 1/2265; F16K 1/228; F16K 1/226; F16K 1/2261; F16K 1/2263
USPC ......................... 137/15.25; 251/305, 306, 308
See application file for complete search history.

(56) References Cited

U.S. PATENT DOCUMENTS

| | | | |
|---|---|---|---|
| 2,011,641 A * | 8/1935 | Kruse | F16K 1/226 239/290 |
| 3,931,955 A | 1/1976 | Jacobs | |
| 4,872,642 A * | 10/1989 | Oshima | F16K 1/2261 251/173 |
| 5,975,494 A | 11/1999 | Gasaway | |
| 7,264,221 B2 * | 9/2007 | Yeary | F16K 1/22 123/337 |
| 2008/0173841 A1 | 7/2008 | Sisk | |
| 2012/0061603 A1 | 3/2012 | Kurihara et al. | |
| 2013/0299729 A1 | 11/2013 | Parrie et al. | |
| 2016/0178067 A1 | 6/2016 | Abouelleil | |

* cited by examiner

Primary Examiner — Ian Paquette
(74) Attorney, Agent, or Firm — Muncy, Geissler, Olds & Lowe, P.C.

(57) ABSTRACT

Provided is a method of manufacturing an eccentric valve of a tri-offset structure including a valve body, a valve seat, a valve unit, and a valve stem. The method includes steps of providing a seal being a centrosymmetric ring with an outer edge surface being a cambered surface with a fixed curvature; disposing the seal on an annular surface of the valve unit; enabling the disposal position of the seal on the annular surface to deviate from the disposal position of a pair of second shaft holes provided in a longitudinal direction of the valve unit.

6 Claims, 10 Drawing Sheets

```
┌─────────────────────────────────────────────────────┐
│ Take a radial cross-section passing through the center of the │
│ valve seat such that the radial cross-section intersects the  │
│ inner edge surface within the range of thickness T of the valve│──── 641
│ seat to form a first line segment and a second line segment,  │
│ the first line segment and the second line segment            │
│ respectively being located on two opposite sides of the first │
│ axial centerline with a 180-degree difference                 │
└─────────────────────────────────────────────────────┘
                            │
                            ▼
┌─────────────────────────────────────────────────────┐
│ Use the first axial centerline as a mirror to create a mirror line│
│ segment from the second line segment, the mirror line         │
│ segment and the first line segment being located on the same  │──── 642
│ side of the first axial centerline, the mirror line segment and│
│ the second line segment being symmetric about the first axial │
│ centerline                                                    │
└─────────────────────────────────────────────────────┘
                            │
                            ▼
┌─────────────────────────────────────────────────────┐
│ Determine an arc being tangent to the first line segment and  │
│ the mirror line segment, and take a radius of curvature of the│──── 643
│ arc as a radius of curvature of the outer edge surface of the │
│ seal on any redial cross-section                              │
└─────────────────────────────────────────────────────┘
```

FIG. 7

METHOD OF MANUFACTURING AN ECCENTRIC VALVE

CROSS-REFERENCE TO RELATED APPLICATIONS

The present application is a divisional application claiming the benefit of U.S. non-provisional application Ser. No. 14/617,693, filed on Feb. 9, 2015, which claims the benefit of TW patent application Ser. No. 10/314,3797, filed on Dec. 16, 2014, and all of which are incorporated herein by reference in their entireties.

TECHNICAL FIELD

The present disclosure relates to an eccentric valve, and particularly to an eccentric valve having a tri-offset structure.

DESCRIPTION OF THE PRIOR ART

A butterfly valve, which is a commonly-used fluid valve, includes an axially-penetrating shaft hole for the insertion of a drive shaft whereby a valve unit of the butterfly valve is driven and rotated, so the valve unit can be opened or closed, wherein the valve unit is designed to have a tri-offset structure. A conventional eccentric valve includes a valve body having a valve chamber; a valve stem penetrating the valve body; a valve seat received in the valve chamber; a seal which is an O-ring, and is asymmetric on both ends of a radial section thereof; a valve unit provided with a shaft hole in an axial direction thereof, the shaft hole being configured to allow the valve stem to penetrate therethrough for controlling the opening and closing of the valve unit. The seal is disposed on the valve unit and configured to be tightly fit to the valve seat when the valve unit is closed.

The eccentric valve is provided with a tri-offset structure. The seal diverges from the paired shaft holes of the valve unit (i.e., diverges from the valve stem), and the radial centerline of the seal is away from the center of the valve stem by a vertical distance, forming a first offset. Next, a second axial centerlines of the valve stem is away from a first axial centerline by a distance, forming a second offset. Next, an inner surface of the valve seat extends to form a tapered shape, the vertical distance between the peak of the tapered shape and the first axial centerline being not greater than the radius of the valve unit, thus forming a third offset. The tri-offset structure has been clearly described in FIG. 4 and description of the issued U.S. Pat. No. 5,975,494. Conventionally, a side of the tapered shape is parallel to the axial direction of piping, the seal therefore needs to be machined according to various angles of the piping to form an angle providing tight fitting.

Conventionally, the valve seat is tailored to the design of the tri-offset structure. The slope of the inner side of the valve seat needs to match the slope of the aforementioned offset tapered shape. In other words, the upper part of the inner side of the valve seat is oblique, while the lower part of the inner side of the valve seat is horizontal. These two slopes match the slopes of the tapered shape, and the slopes of the inner side of the entire valve seat continuously vary from the top down.

With the aforementioned tapered shape design, an annular seal needs to be formed as a radially asymmetric circle with respect to its axis, in order to enable the seal to tightly seal the valve body. As such, when the circularly asymmetric seal is mounted on the outer side of the valve unit against the valve set, the seal can firmly contact the inner side of the valve seat at various positions on the edge of the seal, forming a tight sealing. Because the seal is a radially asymmetric circle with respect to its axis, it is difficult to be manufactured. Also, the mounting of the seal is directional. When being mounted, such seal needs to be inserted into the valve body. However, as the seal slides, the tight sealing will be damaged, causing leakage.

SUMMARY

The present disclosure provides an eccentric valve, comprising: a valve body, a through hole being provided at the center of the valve body, and a first shaft hole passing through the through hole being provided in a longitudinal direction of the valve body; a valve seat which is ring-shaped, an inner edge surface of the valve seat consisting a part of a tapered face of an oblique cone, the valve seat being accommodated in the through hole and disposed in the valve body, the peak of the oblique cone offsetting a first axial centerline passing through the center of the through hole; a valve unit which is disc-shaped and has an annular surface, a pair of second shaft holes being provided in a longitudinal direction of the valve unit, the valve unit being accommodated in the through hole, the pair of second shaft holes being aligned with the first shaft hole; a valve stem which is bar-shaped, the valve stem penetrating the first shaft hole, passing through the through hole and penetrating the pair of second shaft holes, thereby controlling the rotation of the valve unit in the through hole, a second axial centerline passing through the center of the valve stem deviating from the first axial centerline; and a seal which is a centrosymmetric ring, an outer edge surface of the seal being a cambered surface with a fixed curvature, the seal being mounted on the annular surface of the valve unit, the disposal position of the seal on the annular surface of the valve unit deviating from the disposal position of the pair of second shaft holes, wherein when the valve unit rotates in the through hole to a position where the through hole is completely closed, on any radial cross-section of the eccentric valve, the outer edge surface of the seal presses against the inner edge surface of the valve seat, and no gap exists between the outer edge surface and the inner edge surface of the valve seat, each point where the outer edge surface of the seal presses against the inner edge surface of the valve seat is a point of tangency, with all points of tangency not being located on a same plane.

The present disclosure provides a method of manufacturing an eccentric valve, comprising: providing a valve body having a through hole disposed at center in an axial direction, and a first shaft hole disposed in a longitudinal direction to pass through the through hole, a centerline of the first shaft hole deviating from a center of the through hole; the axial direction being perpendicular to the longitudinal direction, providing a valve seat which is ring-shaped, with an inner surface thereof consisting a part of a tapered face of an oblique cone, the valve seat having a thickness in the axial direction; accommodating the valve seat in the through hole and disposing the valve seat in the valve body, enabling a peak of the oblique cone to offset from a first axial centerline passing through the center of the through hole, and enabling the accommodated position of the valve seat to deviate from the position of the first shaft hole; providing a disc-shaped valve unit having an annular surface and a pair of second shaft holes provided in the longitudinal direction of the valve unit; providing a seal which is a centrosymmetric ring, an outer edge surface thereof being a cambered surface with a fixed curvature; disposing the seal on the annular surface of the valve unit, enabling the disposal position of the seal on the annular surface to deviate from the disposal position of the pair of second shaft holes; accommodating the valve unit in the through hole and aligning the pair of second shaft holes with the first shaft hole, enabling the outer edge surface of the seal to face against the inner surface of the valve seat; and providing a bar-like valve stem configured to penetrate the first shaft hole, pass through the through hole and penetrate the pair of second shaft holes, so as to control the rotation of the valve unit in the through hole, wherein the curvature of the outer edge surface of the seal on any radial cross-section is determined through the following steps: taking a radial cross-section passing through the center of the valve seat such that the radial cross-section intersects the inner edge surface within the range of thickness of the valve seat to form a first line segment and a second line segment, the first line segment and the second line segment respectively being located on two opposite sides of the first axial centerline with a 180 degree difference, and the absolute values of the slopes for the first line segment and the second line segment being mutually different; using the first axial centerline as a mirror line to create a mirror line segment from the second line segment, the mirror line segment and the first line segment being located on the same side of the first axial centerline, the mirror line segment and the second line segment being symmetric about the first axial centerline; and determining an arc being tangent to the first line segment and the mirror line segment, and taking a radius of curvature of the arc as a radius of curvature for the outer surface of the seal on any radial cross-section.

For the eccentric valve of the present disclosure, there is no requirement of directionality for the engagement of the seal and the valve seat thereof. The engagement of the seal and the valve seat will be unaffected regardless of the angle that the valve seat is fitted to the valve body, or that the seal is fitted to the valve unit. Thus, the required time for assembling the eccentric valve of the present disclosure can be decreased.

BRIEF DESCRIPTION OF DRAWINGS

FIG. 7 is a flow chart schematically illustrating steps for determining the curvature of the outer surface of the seal according to one embodiment of the present disclosure.

DETAILED DESCRIPTION OF THE EMBODIMENTS

Figure 1:
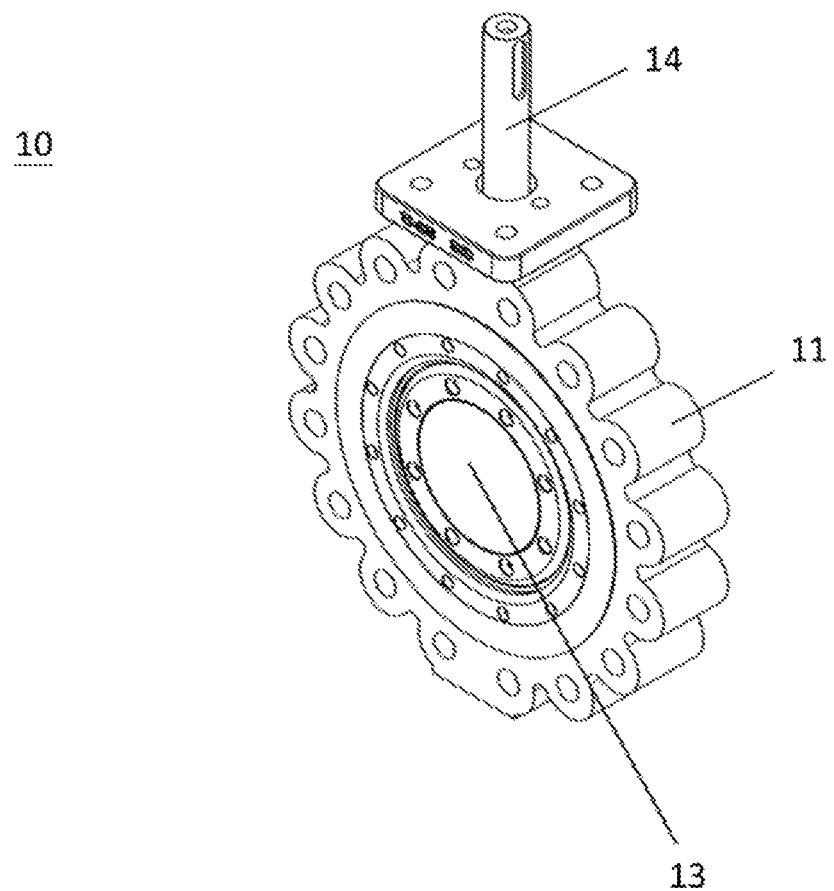
FIG. 1 is a prospective view schematically illustrating an eccentric valve according to one embodiment of the present disclosure.

The structure, resulting effect and advantages of the eccentric valve according to the present disclosure will be described below in detail with reference to the accompanying drawings and preferred embodiments of the eccentric valve according to the present disclosure.

Please refer to FIG. 1 to FIG. 4. An eccentric valve 10 according to an embodiment of the present disclosure is shown to include the following:

A valve body 11, an inner annular wall thereof being formed into a through hole 111, and a first shaft hole 112 penetrating the through hole 111 in the longitudinal direction of the valve body 11. A valve seat 12 is accommodated in the through hole 111. The valve seat 12 is substantially ring-shaped, with an inner edge surface 121 thereof constituting a part of a tapered surface of an oblique cone 1210. The valve seat 12 is provided in the valve body 11, wherein the peak of the oblique cone 1210 offsets from a first axial centerline 1111 passing through the center of the through hole 111. The valve seat 12 in this embodiment is a detachable structure.

A disc-shaped valve unit 13 having an annular surface 131. The valve unit 13 is provided with a pair of second shaft holes 132 in the longitudinal direction of the valve unit 13. The valve unit 13 is accommodated in the through hole 111 of the valve body 11, with the pair of second shaft holes 132 being aligned with the first shaft hole 112.

A bar-like valve stem 14 penetrating the first shaft hole 112 of the valve body 11, passing through the through hole 111 and penetrating the second shaft holes 132. The rotation of the valve stem 14 causes the valve unit 13 to rotate in the through hole 111. A second axial centerline 141 passing through the center of the valve stem 14 deviates from the first axial centerline 1111 by a vertical distance K. In other embodiments, the top of the valve stem 14 may be connected to a valve operator (not shown) for driving the valve unit 13 to rotate.

Figure 4:
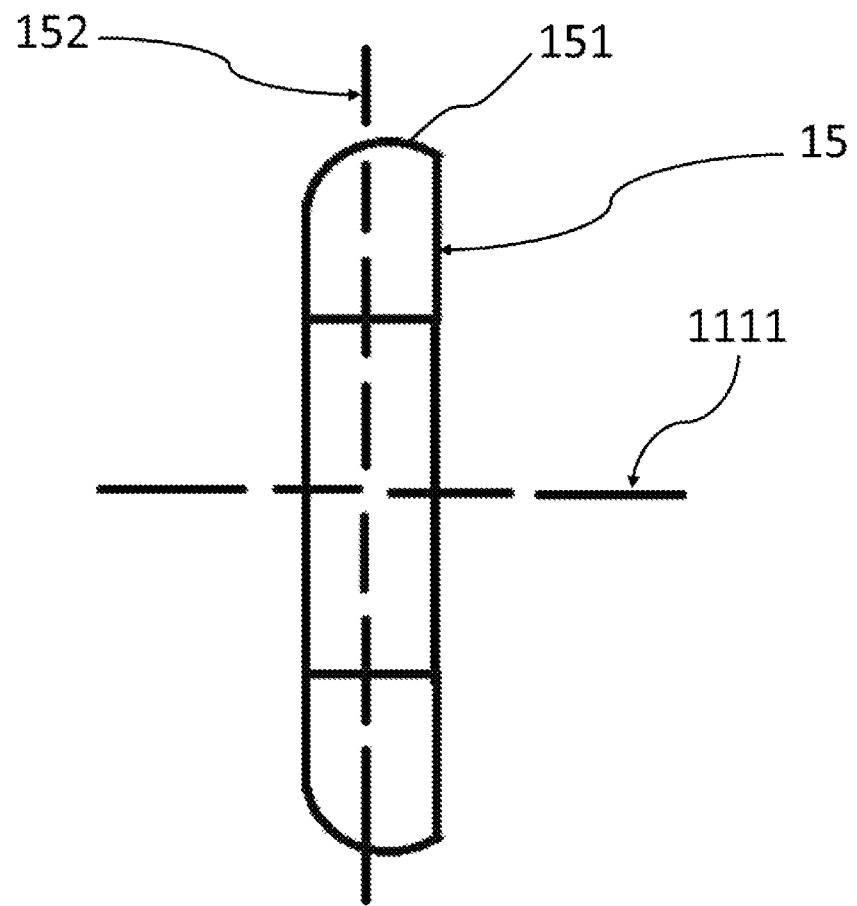
FIG. 4 is a radial cross-sectional top view schematically illustrating a seal according to one embodiment of the present disclosure.

A seal 15 made of metal. As shown in FIG. 4, the seal 15 is a centrosymmetric ring, and an outer edge surface 151 thereof is a cambered surface with a fixed curvature, wherein the radius of curvature of the outer edge surface 151 ranges from 8 mm to 60 mm. The radius of curvature is determined depending on the type of the eccentric valve. The seal 15 is mounted on the annular surface 131 of the valve unit 13, and is disposed at a position on the annular surface 131 that deviates from the aforementioned pair of second shaft holes 132.

Figure 2:
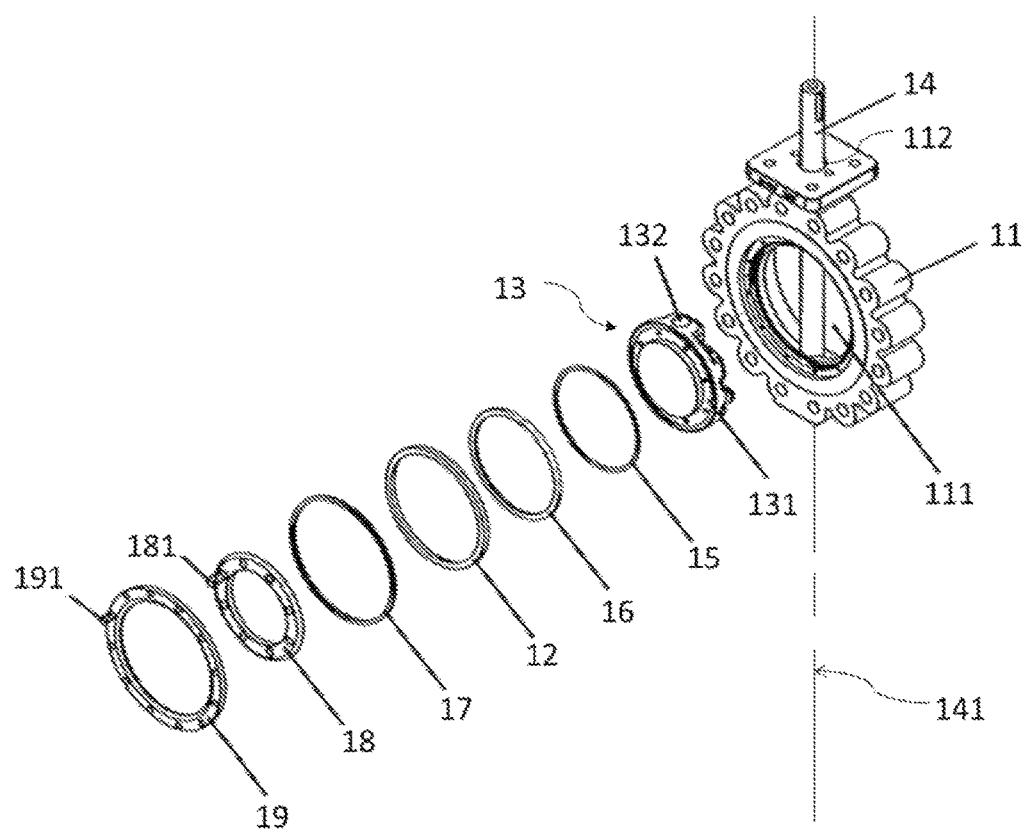
FIG. 2 is an explosion view schematically illustrating the eccentric valve according to one embodiment of the present disclosure.
Figure 3:
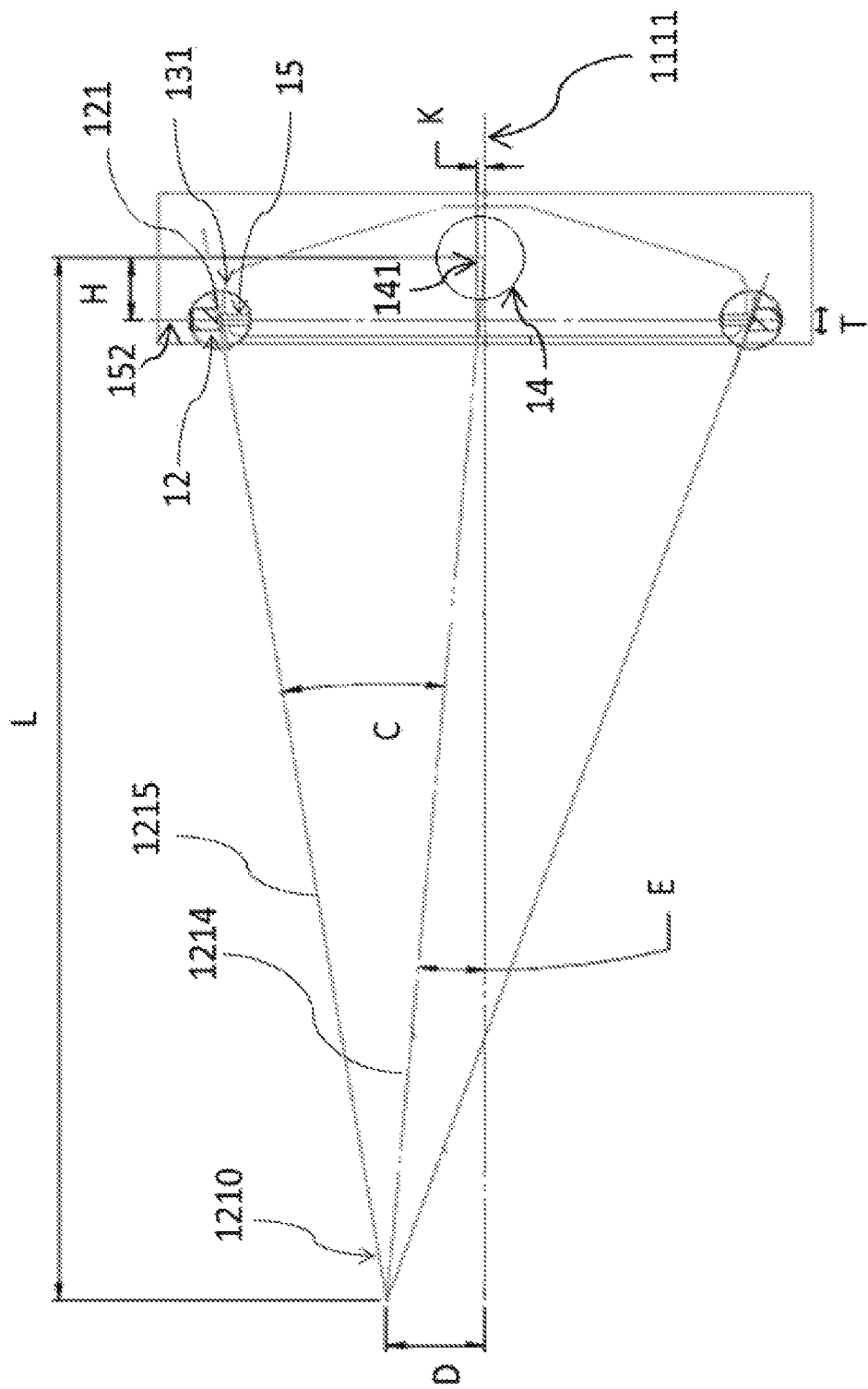
FIG. 3 is a radial cross-sectional top view schematically illustrating an assembly of respective components of the eccentric valve according to one embodiment of the present disclosure.

Please refer to both FIG. 2 and FIG. 3. FIG. 2 is an explosion view schematically illustrating the eccentric valve according to one embodiment of the present disclosure, and FIG. 3 is a radial cross-sectional top view schematically illustrating an assembly of respective components of the eccentric valve according to one embodiment of the present disclosure. When being assembled, the valve seat 12 and a seal ring 17 are first placed into the valve body 11 from one side of the through hole 111 of the valve body 11, then a valve seat cover 19 is fastened to the valve body with a screw 191, thereby fixing the valve seat 12 and the seal ring 17 between the valve seal cover 19 and the valve body 11. Next, the seal 15 and an annular liner 16 are installed to a side of the valve unit 13 such that the seal 15 and the annular liner 16 are mounted onto the valve unit 13, and that the seal 15 and the annular liner 16 are adjacent to each other. Then a valve unit cover 18 is fastened to the valve unit 13 with a screw 181 for fastening the seal 15 and the annular liner 16. Next, the valve unit 13 is placed into the valve body 11, so that the outer edge of the seal 15 and the inner edge of the valve seat 12 press against each other. The valve stem 14 then penetrates the first shaft hole 112 and the second shaft holes 132 so as to hold the valve unit 13 and the valve body 11. In the present embodiment, once the valve body cover 18 is removed, the annular liner 16 and seal 15 can be detached, which is very convenient for maintenance.

As mentioned above, the valve unit 13 is placed in the through hole 111, and the rotation of the valve stem 14 can drive the valve unit 13 to rotate in the through hole 111. Accordingly, when the valve unit 13 rotates to a particular angle, the through hole 111 can be closed. Once the valve unit 13 rotates in the through hole 111 to a position where the through hole 111 is completely closed, on any radial cross-section of the valve 11 of the eccentric valve 10, the outer edge surface 151 of the seal 15 presses against the inner edge surface 121 of the valve seat 12 at a point thereon, and no gap exists between the outer edge surface 151 and the inner edge surface 121, i.e., both sides of the through hole 111 are completely separated. In addition, in view of the cross-section, each point where the outer edge surface 151 of the seal 15 and the inner edge surface 121 of the valve seat 12 press against each other is a point of tangency, and all points of tangency are not located on the same plane.

Next, as mentioned above and in FIG. 3, the radius of curvature for the inner edge surface 121 of the valve seat 12 determines the oblique cone 1210. A vertical distance L presents between the peak of the oblique cone 1210 and the valve stem 14; a vertical distance D presents between the peak of the oblique cone 1210 and the first axial centerline 1111; a vertical distance H presents between the second axial centerline 141 and a radial centerline 152 of the seal 15, and the valve seat 12 has a thickness T in the axial direction thereof, wherein the vertical distance D is smaller than the radius of the through hole 111 and ranges from 90 mm to 1500 mm. In addition, the connection between the peak of the oblique cone 1210 and the center of the valve stem 14 forms a connection line 1214. An included angle E presents between the connection line 1214 and the axial centerline 1111 and ranges from 2.5 to 10 degrees. The connection between any point on the inner edge surface 121 of the valve seat 12 and the peak of the oblique cone 1210 forms a connection line 1215. An included angle C presents between the connection line 1215 and the connection line 1214 and ranges from 10 to 30 degrees.

The valve body 11 of the present disclosure is provided with a tri-offset structure. Such tri-offset structure means that: the seal 15 deviates from the paired second shaft holes 132 (i.e., deviates from the valve stem 14), and the radial centerline 152 of the seal 15 is away from the center of the valve stem 14 by the vertical distance H, forming a first offset; the second axial centerline 141 of the valve stem 14 deviates from the first axial centerline 1111 by the vertical distance K, forming a second offset; the oblique cone 1210 is formed by a first line segment 1211 and a second line segment 1212 (lines extending from both sides of the inner edge surface 121 of the valve seat 12 in the radial cross-section as shown in FIG. 5), and the vertical distance D between the peak of the oblique cone 1210 and the first axial centerline 1111 is not greater than the radius of the valve unit 13, as shown in FIG. 3, thus forming a third offset.

Figure 5A:
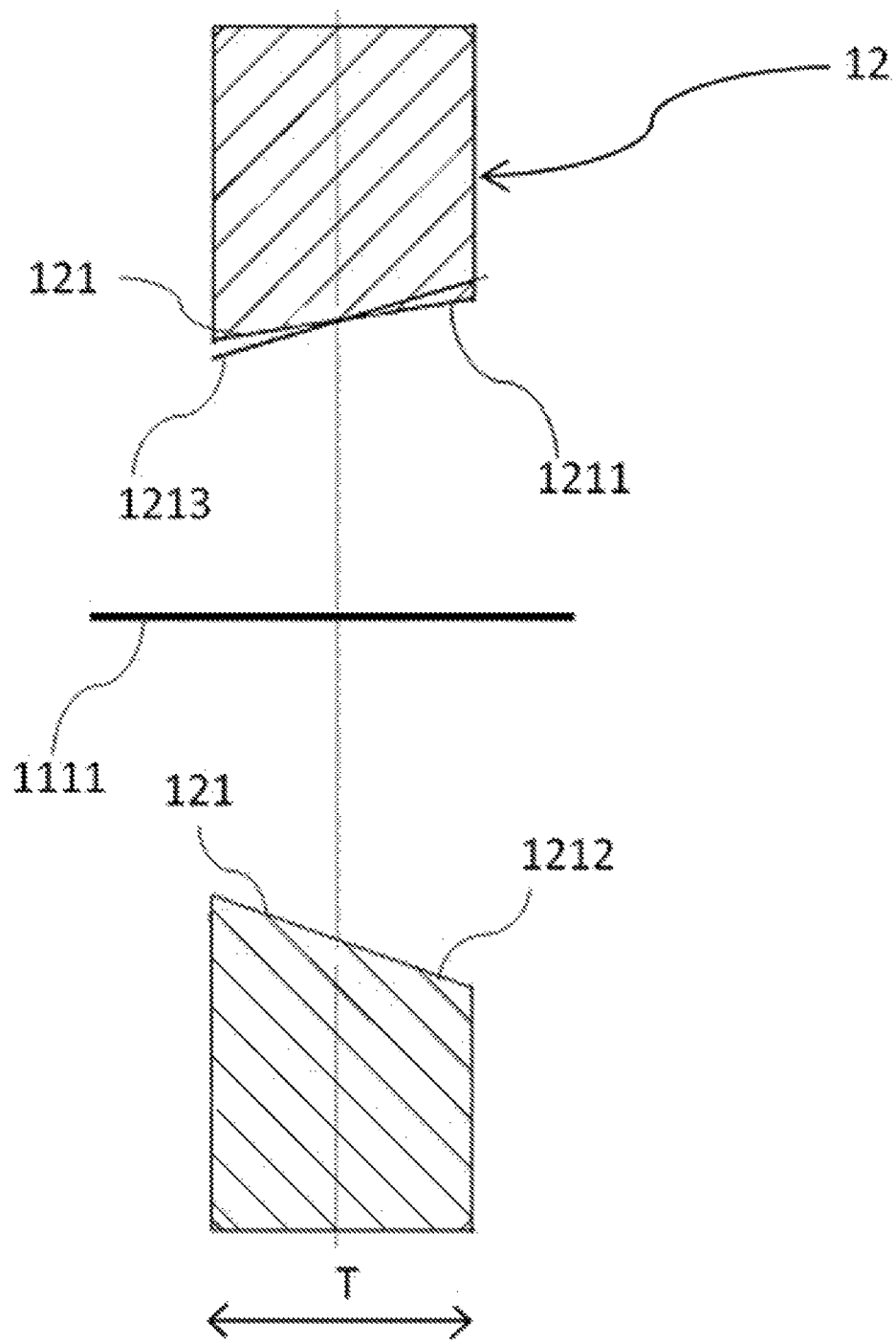
FIG. 5A is a radial cross-sectional top view schematically illustrating a valve seat according to one embodiment of the present disclosure.
Figure 5B:
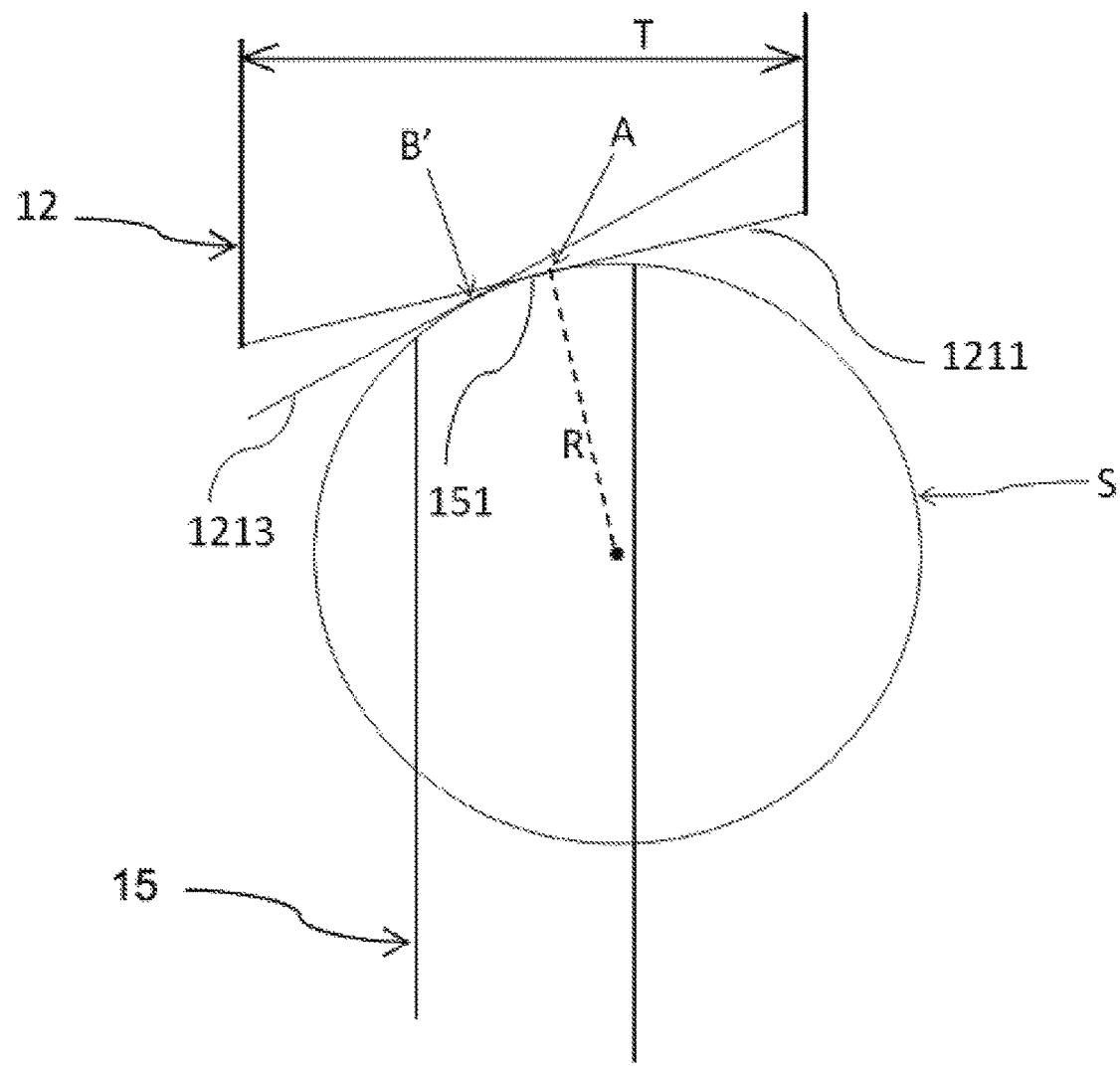
FIG. 5B is an enlarged radial cross-sectional view schematically illustrating the valve seat according to one embodiment of the present disclosure.
Figure 5C:
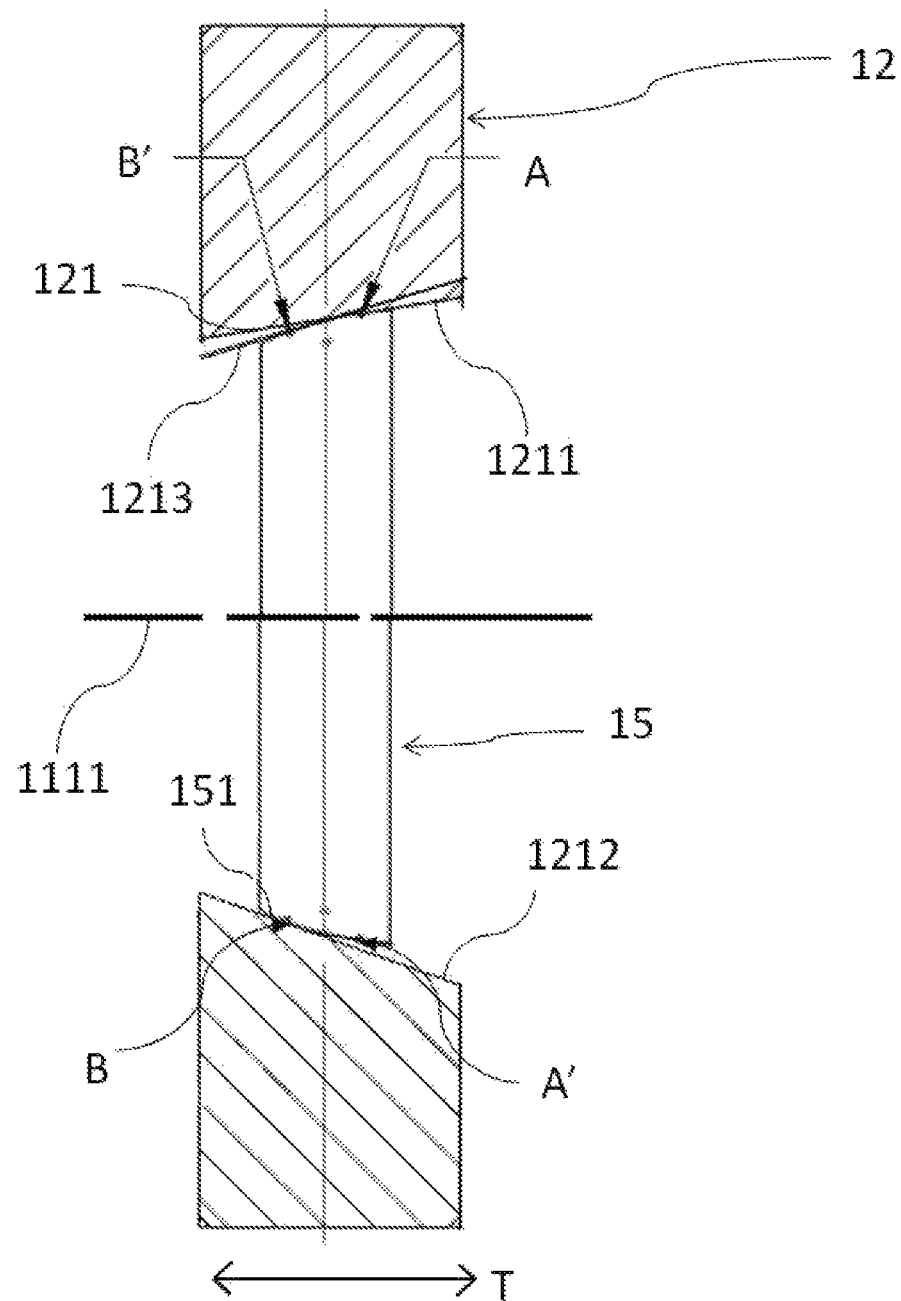
FIG. 5C is a radial cross-sectional top view schematically illustrating an assembly of the valve seat and the seal according to one embodiment of the present disclosure.

It is to be described that the eccentric valve 10 of the present disclosure is provided with a special design. Please refer to FIG. 5A, which is a radial cross-sectional top view of the valve seat 12 according to one embodiment of the present disclosure. As shown in FIG. 5A, a radial cross-section is taken with respect to the center of the valve seat 12. Here, taking a radial cross-section with respect to the center of the valve seat 12 means taking a cross-section passing the center of the valve seat 12 along the diameter direction of the valve seat 12. Since the valve seat 12 is an annular ring, a normal vector of the cross-section passing the center of the valve seat 12 and taken along the diameter direction of the valve seat 12 is perpendicular to the axial centerline of annular ring of the valve seat 12. In the cross-sectional view, the valve seat 12 is divided into an upper part and a lower part. The inner edge surface 121 in the upper part intersects the radial center cross-section to form the first line segment 1211, while the inner edge surface 121 in the lower part intersects the radial center cross-section to form the second line segment 1212. The first and second line segments 1211 and 1212 are located on both sides of the first axial centerline 1111, respectively. Apparently, the first line segment 1211 and the second line segment 1212 are located on the circular conical surface of the oblique cone 1210. Further, the absolute values of the slopes of the first and second line segments 1211 and 1212 are not equal. A mirror line segment 1213 can be obtained if the second line segment 1212 is mirrored with respect to the first axial centerline 1111. Apparently, the mirror line segment 1213 will intersect the first line segment 1211 at an intersection point, which is located within the range of the thickness T of the valve seat 12. Next, as shown in FIG. 5B, according to the specification of the eccentric valve 10, a radius is given for making a circle S being tangent to both the first line segment 1211 and the mirror line segment 1213. The first line segment 1211 is tangent to the circle S at a point A, and the mirror line segment 1213 is tangent to the circle S at a point B'. The center of the circle S is located between the upper and lower parts of the valve seat 12. The radius of the circle S is the radius of curvature R for the outer edge surface 151 of the seal 15. This radius of curvature R may be used to form the outer edge surface 151 being tangent to various points on the inner edge surface 121 of the valve seat 12, so the seal 15 can be produced according to the radius of curvature R. As shown in FIG. 5C, for the seal 15 produced according to the radius of curvature R, the outer edge surface 151 of the seal 15 is an arc on the periphery of a circle having the radius R, and the seal 15 will be tangent to the first line segment 1211 at the point A, tangent to the second line segment 1212 at a point B, and tangent to the mirror line segment 1213 at the point B'. It is obvious that the points B and B' have a mirrored correlation with respect to the first axial centerline 1111. Additionally, the distance from the point A to the intersection point of the first line segment 1211 and mirror line segment 1213 is equal to that from the point B' to the intersection point of the first line segment 1211 and mirror line segment 1213.

Figure 6:
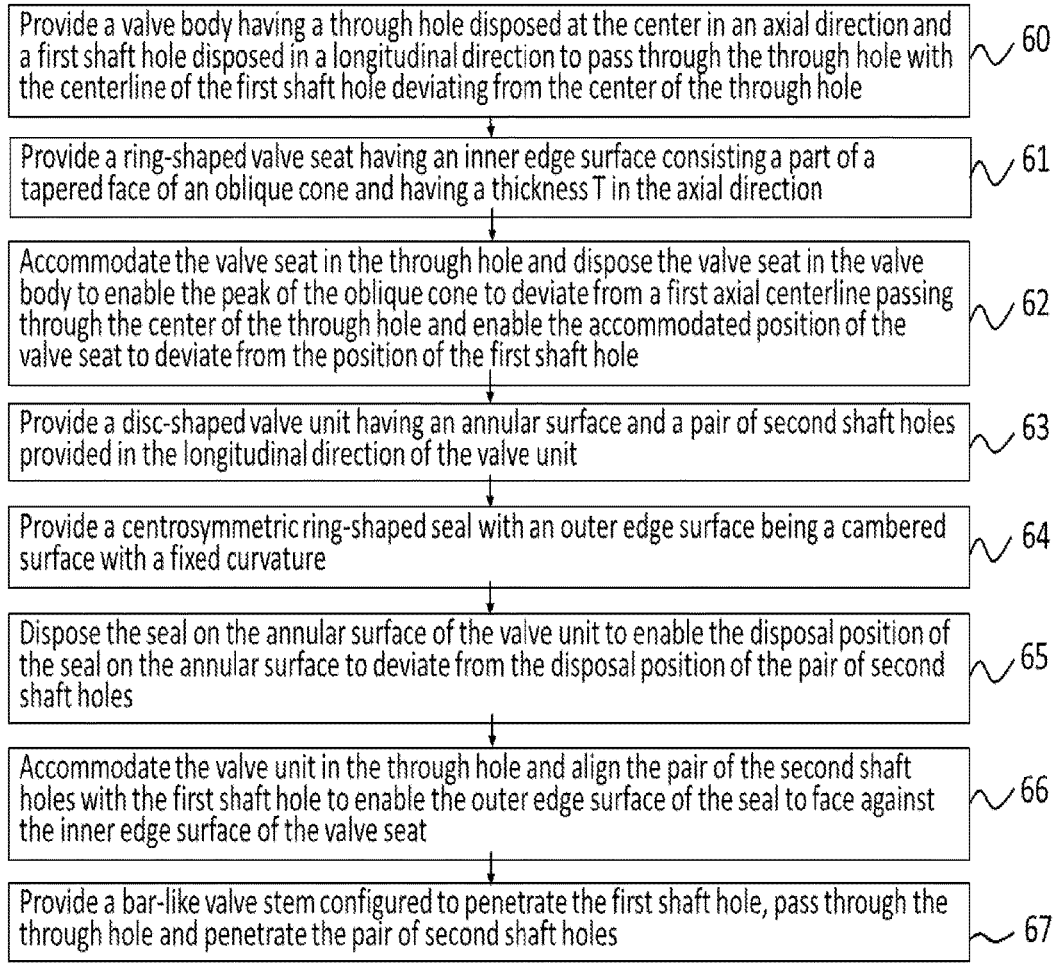
FIG. 6 is a flow chart schematically illustrating steps of the manufacturing method of the eccentric valve according to one embodiment of the present disclosure.

From the description above, the eccentric valve 10 of the present disclosure is manufactured using a particular method. The eccentric valve 10 of the present disclosure cannot be accomplished only by achieving the aforementioned triple offset conditions. The detailed manufacturing method is illustrated in FIG. 6.

Step 60: provide a valve body 11 having a through hole 111 disposed at center in an axial direction and a first shaft hole 112 disposed in a longitudinal direction to pass through the through hole 111. The centerline of the first shaft hole 112 deviates from the center of the through hole 111. The axial direction is perpendicular to the longitudinal direction.

Step 61: provide an annular and/or ring-shaped valve seat 12 having the inner edge surface 121 thereof constituting a part of a tapered surface of an oblique cone 1210. The valve seat 12 has a thickness T in the axial direction.

Step 62: accommodate the valve seat 12 in the through hole 111. The valve seat 12 is disposed in the valve body 11. The peak of the oblique cone 1210 offsets from a first axial centerline 1111 passing through the center of the through hole 111, and the accommodating position of the valve seat 12 deviates from the first shaft hole 112.

Step 63: provide a disc-shaped valve unit 13, which has an annular surface 131 and is provided with a pair of second shaft holes 132 in the longitudinal direction.

Step 64: provide a centrosymmetric and ring-shaped seal 15. An outer edge surface 151 of the seal 15 is a cambered surface with a fixed curvature.

Step 65: dispose the seal 15 onto the annular surface 131 of the valve unit 13, and dispose the seal 15 at a position on the annular surface 131 that deviates from the disposal position of said pair of second shaft holes 132.

Step 66: accommodate the valve unit 13 in the through hole 13. Said pair of second shaft holes 132 are aligned with the first shaft hole 112, and the outer edge surface 151 of the seal 15 faces against the inner edge surface 121 of the valve seat 12.

Step 67: provide a bar-like valve stem 14 configured to penetrate the first shaft hole 112, pass through the through hole 111 and penetrate the pair of second shaft holes 132, so as to control the rotation of the valve unit 13 in the through hole 111.

Regarding the outer edge surface 151 of the seal 15 mentioned in the step 64, any radial radius of curvature R thereof is determined through the following steps, which are also shown in FIG. 7:

Step 641: take a radial cross-section passing through the center of the valve seat 12, as shown in FIG. 5A. The radial cross-section intersects the inner edge surface 121 within the range of thickness T of the valve seat 12 to form a first line segment 1211 and a second line segment 1212. The first line segment 1211 and the second line segment 1212 are respectively located on two opposite sides of the first axial centerline 1111 with a 180-degree difference. Both the first and second line segments 1211 and 1212 are located on the tapered surface of the oblique cone. In addition, the absolute values of the slopes for the first and second line segments 1211 and 1212 are mutually different.

Step 642: use the first axial centerline 1111 as a mirror line to create a mirror line segment 1213 from the second line segment 1212. The mirror line segment 1213 and the first line segment 1211 are located on the same side of the first axial centerline 1111. The mirror line segment 1213 and the second line segment 1212 are symmetric about the first axial centerline 1111.

Step 643: give a radius according to the specification of the eccentric valve 10, as shown in FIG. 5B, to make a circle S which is tangent to both the first line segment 1211 and the second line segment 1212. An arc tangent to the first line segment 1211 and the mirror line segment 1213 is picked from the circle S. The radius of the circle S is taken as the radius of curvature R of the outer edge surface 151 of the seal 15 on any radial cross-section, and the arc is taken as a part of the outer edge surface 151 of the seal 15. As shown in FIG. 5C, after the first line segment 1211 and the mirror line segment 1213 to which the arc is tangent and the radius of curvature R are determined, the arc can be determined, thereby obtaining the seal 15 from the arc.

Figure 8:
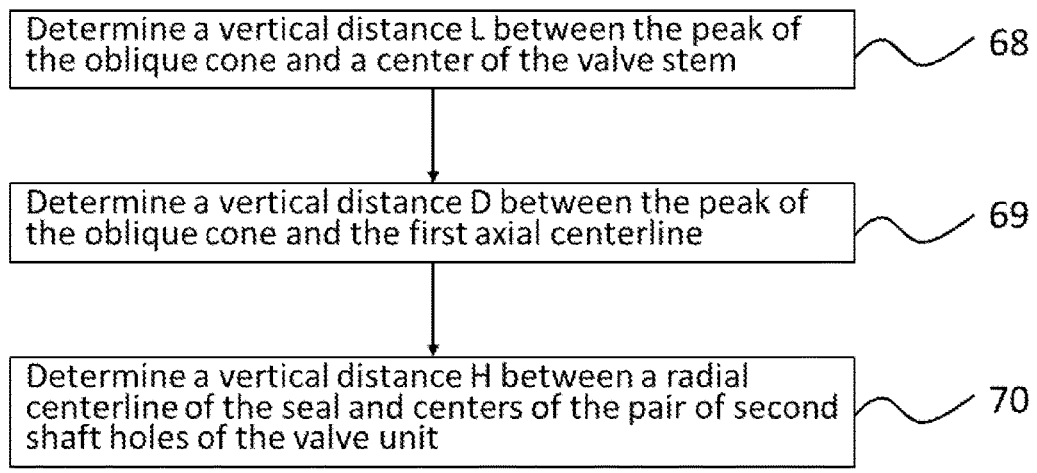
FIG. 8 is a flow chart schematically illustrating further steps of the manufacturing method of the eccentric valve according to one embodiment of the present disclosure.

Further, the aforementioned manufacturing method of the eccentric valve 10 includes the following steps, as shown in FIG. 8:

Step 68: determine a vertical distance L between the peak of the oblique cone 1210 and a center of the valve stem 14.

Step 69: determine a vertical distance D between the peak of the oblique cone 1210 and the first axial centerline 1111.

Step 70: determine a vertical distance H between a radial centerline 152 of the seal 15 and centers of the pair of second shaft holes 132 of the valve unit 13.

In order to meet the tri-offset design, it is necessary for the slope of the inner edge of the aforementioned valve seat 12 to conform with the slope of the aforementioned oblique cone. In other words, as shown in FIG. 3, the upper inner side of the valve seat 12 has a gentler slope, while the lower inner side of the valve seat 12 has a steeper slope. The slope of the entire inner edge of the valve seat 12 continuously varies in sequence.

In the eccentric valve 10 of the present disclosure, when the through hole 111 is closed by the valve unit 13, the components engaging each other as well as closing the gap between the valve unit 13 and the valve body 11 are the valve seat 12 and the seal 15, wherein the inner edge surface 121 of the valve seat 12 is a part of the tapered surface of the oblique cone 1210, and the seal 15 is a symmetric circular ring. Obviously, there is no requirement of directionality for the engagement of the seal 15 and the valve seat 12. The engagement of the seal 15 and the valve seat 12 will be unaffected regardless of the angle that the valve seat 12 is fitted to the valve body, or that the seal 15 is fitted to the valve unit 13. Thus, the required time for assembling the eccentric valve 10 of the present disclosure can be decreased, and the possibility that the eccentric valve become unusable due to faulty assembling can also be reduced.

Summing up the above, the considerate design of the present disclosure definitely meets practical requirements. The present disclosure cures the deficiencies of existing eccentric valves, and is significantly advantageous over the conventional techniques. Accordingly, the present disclosure produces an improved effect and cannot be easily accomplished. Also, since the technique of the present disclosure is not published or disclosed in native or foreign documents or market, the present disclosure fully complies with the regulations of the Patent Act.

The detailed description set forth above is a specific illustration for preferred embodiments of the present disclosure. However, these embodiments are not intended to limit scope of the present disclosure, and equivalents or modifications which do not depart from the spirit of the present disclosure should also be included in the scope of the present disclosure.

What is claimed is:

1. A method of manufacturing an eccentric valve, comprising:
providing a valve body having a through hole disposed at center in an axial direction, and a first shaft hole disposed in a longitudinal direction to pass through the through hole, a centerline of the first shaft hole deviating from a center of the through hole, the axial direction being perpendicular to the longitudinal direction; providing a ring-shaped valve seat having an inner edge surface thereof consisting a part of a tapered face of an oblique cone, the valve seat having a thickness in the axial direction;

accommodating the valve seat in the through hole and disposing the valve seat in the valve body, enabling a peak of the oblique cone to offset from a first axial centerline passing through the center of the through hole, and enabling the accommodated position of the valve seat to deviate from the position of the first shaft hole;

providing a disc-shaped valve unit having an annular surface and a pair of second shaft holes provided in the longitudinal direction of the valve unit;

providing a seal which is a centrosymmetric ring, an outer edge surface thereof being a cambered surface with a fixed curvature; disposing the seal on the annular surface of the valve unit, enabling the disposal position of the seal on the annular surface to deviate from the disposal position of the pair of second shaft holes;

accommodating the valve unit in the through hole and aligning the pair of second shaft holes with the first shaft hole, enabling the outer edge surface of the seal to face against the inner edge surface of the valve seat; and providing a bar-like valve stem configured to penetrate the first shaft hole, pass through the through hole and penetrate the pair of second shaft holes, so as to control the rotation of the valve unit in the through hole;

wherein the curvature of the outer edge surface of the seal on any radial cross-section is determined through the following steps:

taking a radial cross-section passing through a center of the valve seat such that the radial cross-section intersects the inner edge surface within the range of thickness of the valve seat to form a first line segment and a second line segment, the first line segment and the second line segment being respectively located on two opposite sides of the first axial centerline with a 180-degree difference, and absolute values of slopes for the first line segment and the second line segment being mutually different;

using the first axial centerline as a mirror line to create a mirror line segment from the second line segment, the mirror line segment and the first line segment being located on the same side of the first axial centerline, the mirror line segment and the second line segment being symmetric about the first axial centerline; and determining an arc being tangent to the first line segment and the mirror line segment, and taking a radius of curvature of the arc as a radius of curvature for the outer edge surface of the seal on any radial cross-section.

2. The method of manufacturing the eccentric valve of claim 1, further comprising:
determining a vertical distance between the peak of the oblique cone and a center of the valve stem;
determining a vertical distance between the peak of the oblique cone and the first axial centerline; and
determining a vertical distance between a radial centerline of the seal and centers of the pair of second shaft holes of the valve unit.

3. The method of manufacturing the eccentric valve of claim 1, wherein the radius of curvature of the arc ranges from 8 mm to 60 mm.

4. A method of manufacturing a seal of an eccentric valve, the eccentric valve comprising a valve body with a through hole, an annular valve seat accommodated in the through hole and mounted in the valve body, a disc-like valve unit accommodated in the through hole and disposed in the valve body, and a valve stem penetrating the valve body and the disc-like valve unit, the seal being mounted to the disc-like valve unit, the method comprising:

taking a radial cross-section passing through a center of the valve seat such that the radial cross-section intersects the inner edge surface within the range of a thickness of the valve seat to form a first line segment and a second line segment, the first line segment and the second line segment being respectively located, with a 180-degree difference, on two opposite sides of a first axial centerline passing through center of the through hole, and absolute values of slopes for the first line segment and the second line segment being mutually different;

using the first axial centerline as a mirror line to create a mirror line segment from the second line segment, the mirror line segment and the first line segment being located on the same side of the first axial centerline, the mirror line segment and the second line segment being symmetric about the first axial centerline; and determining an arc being tangent to the first line segment and the mirror line segment, and taking a radius of curvature of the arc as a radius of curvature for an outer edge surface of the seal on any radial cross-section.

5. The method of manufacturing the seal of the eccentric valve of claim 4, wherein the radius of curvature of the arc ranges from 8 mm to 60 mm.

6. The method of manufacturing the seal of the eccentric valve of claim 4, further comprising:
determining a vertical distance between an intersection point of the extended first and second line segments and a center of the valve stem;
determining a vertical distance between an intersection point of the extended first and second line segments and the first axial centerline; and
determining a vertical distance between a radial centerline of the seal and a center of the valve unit.

* * * * *